Jan. 29, 1963 J. A. SILBEREIS 3,075,788
TANDEM BICYCLE FRAME
Filed June 5, 1961
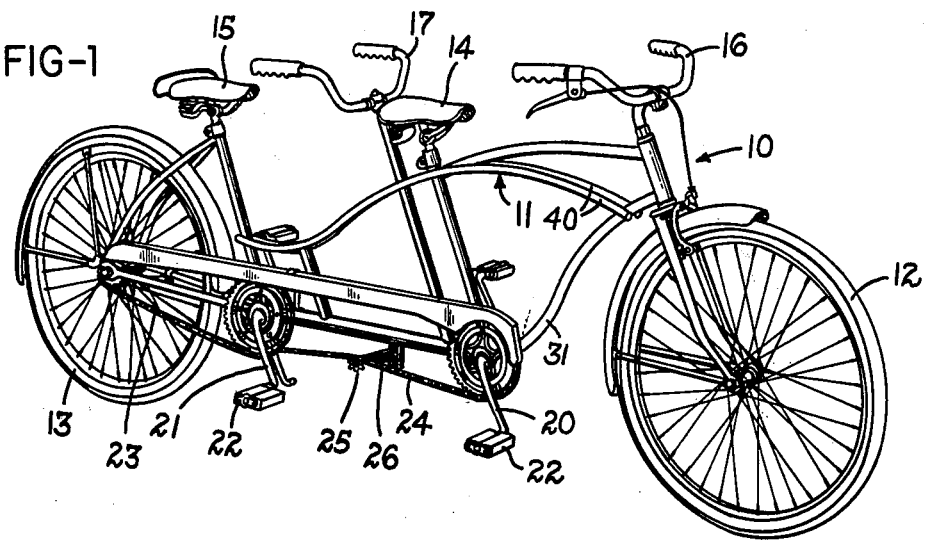
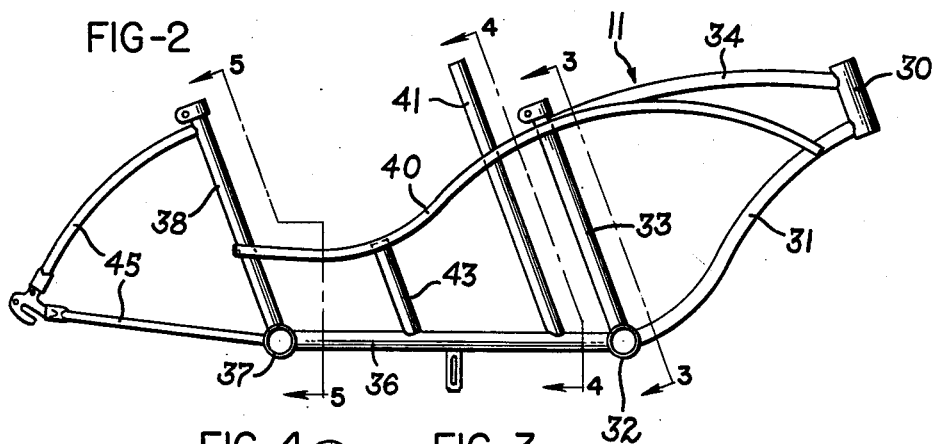
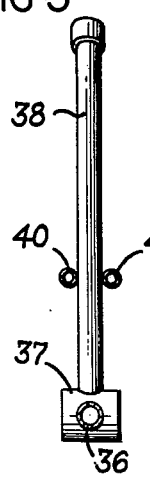
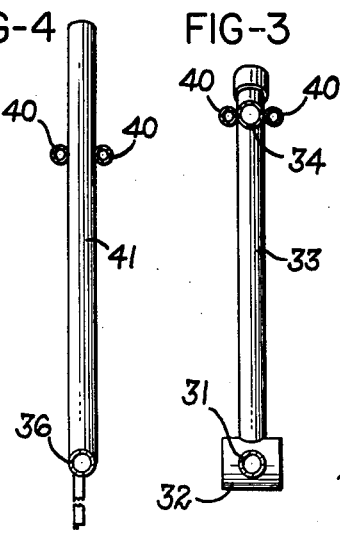
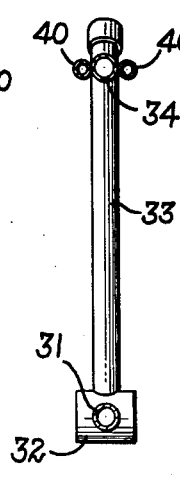
*INVENTOR.*
JOSEPH A. SILBEREIS
BY
Marechal, Biebel, French & Bugg
ATTORNEYS 3,075,788
TANDEM BICYCLE FRAME
Joseph A. Silbereis, Dayton, Ohio, assignor to The Huffman Manufacturing Company, Dayton, Ohio, a corporation of Ohio
Filed June 5, 1961, Ser. No. 115,021
3 Claims. (Cl. 280—281)

This invention relates to bicycles and particularly to tandem bicycles.

One object of this invention is to provide an improved frame construction for a tandem bicycle.

Another object of the invention is to provide a frame for a tandem bicycle which has increased structural rigidity without substantial increase in the weight thereof.

A further object of the invention is to provide a tandem bicycle frame having a configuration which provides the rear cyclist with a handle bar within comfortable reach without affecting the position of the front seat.

A still further object of the invention is to provide an improved tandem bicycle frame having a construction which provides increased comfort for both riders and increased rigidity in the entire frame without loss of a streamlined configuration.

Additional objects and advantages of the invention will be appparent from the following description, the accompanying drawings and the appended claims.

In the drawing—

FIG. 1 is a perspective showing of a tandem bicycle having a frame in accordance with the invention;

FIG. 2 is a side view of a frame in accordance with the invention;

FIG. 3 is a sectional view taken essentially along the line 3—3 of FIG. 2;

FIG. 4 is another sectional view taken essentially along the line 4—4 of FIG. 2; and FIG. 5 is still another sectional view taken essentially along the line 5—5 of FIG. 2.

Referring to the drawing, which illustrates a preferred embodiment of the invention, FIG. 1 illustrates a tandem bicycle 10 having an integral frame 11 with front and rear wheels 12 and 13, saddles 14 and 15, and handle bars 16 and 17 mounted thereon. The bicycle 10 is propelled in a conventional manner by cranking the front and/or rear cranks 20 and 21 through pedals 22, which rotation is transmitted to the rear wheel 13 via the drive chain 23. Excess sagging of the drive chain 24 between the front and rear cranks 20 and 21 is obviated by the idler gear 25 mounted on bracket 26 which has been attached to the frame 11.

The invention is particularly directed to the construction and configuration of frame 11 which provides increased structural rigidity as well as added comfort for the cyclists. As shown in FIG. 2, the front fork housing 30 has a lower reach bar or tube 31 rigidly secured thereto, e.g., by welding, which bar extends rearwardly and downwardly to a similar connection with the front crank housing 32. The front seat mast 33 is rigidly secured to and extends upwardly from the front crank housing 32 and connects near the uppermost end thereof to an upper reach bar or tube 34 which is also rigidly connected to the fork housing 30. The fork housing 30, the lower and upper reach bars 31 and 34, and the front seat mast 33 thus form a rigid quadrangle.

Extending substantially horizontally from the front crank housing 32 is a rear reach bar 36 having the rear crank housing 37 secured to its rearwardmost end. The rear seat mast 38 extends upwardly from the rear crank housing 37 in substantially the same manner as the aforesaid front seat mast 33.

To add substantial rigidity to the entire frame, the double bars or tubes 40 are tangentially welded to the forwardmost portion of the lower reach bar 31 and extend generally horizontally to a similar connection with the upper portion of the front seat mast 33, as shown in FIG. 3. From that connection, the double bars 40 slope slightly downwardly to a connection on the upper portion of the rear handle bar post 41, as shown in FIG. 4, and then end in a connection with the lower half of the rear seat mast 38, as shown in FIG. 5. The double bars thus tie the entire frame together without intercepting or otherwise weakening, in any manner, the members to which they are secured. Further, the continuous double bars 40 are rigidly welded or brazed to each of the members 31, 33, 41 and 38 in a manner which effectively creates an integral connection therebetween.

The rear handle bar post 41 provides additional strength and rigidity to the frame 11 in the area which is most highly stressed, that is, the area between the seat masts 33 and 38. In particular, the rear handle bar post 41 is rigidly secured to the rear reach bar 36 near the front crank housing and extends upwardly in substantially parallel relationship with the front and rear seat masts 33 and 38 to a rigid connection with bars 40. In addition to the strengthening of the frame, the rear handle bar 41 permits the rear handle bars 17 to be adjustably mounted thereon in position to accommodate the rear cyclist comfortably without modification of or interference with the rear seat position.

A tubular bar 43 extends between the rear reach bar 36 and the double bars 40, as shown in FIG. 2, to maintain the spaced relationship between the latter two structural members hence adding additional rigidity to the frame. The rear fork 45 is of a somewhat conventional design and is secured to the rear seat mast 38 and the rear crank housing 37, as shown in FIG. 2. It is within the scope of this invention to use other well known rear fork configurations in place of the one shown, if desired.

Each juncture of the frame of the invention is preferably of the conventional welded or brazed type which rigidly interconnects the frame components, but other fastening expedients can be utilized to secure the frame members together so long as such expedients form rigid connections which will withstand the normal stressing of such frame and maintain the general overall configuration thereof.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A tandem bicycle frame comprising a fork housing; a front crank housing; a lower reach bar rigidly interconnecting said fork housing and said front crank housing; a rear reach bar rigidly connected to said front crank housing and extending substantially horizontally rearwardly therefrom; a rear crank housing rigidly mounted on the rearward end of said rear reach bar; front and rear seat masts rigidly connected to and extending upwardly from said front and rear crank housing, respectively; an upwardly extending rear handle bar post rigidly connected to said rear reach bar at a point between said crank housings; continuous double bars rigidly and tangentially connected on opposite sides near the forward end of said lower reach bar, the upper portion of said front seat mast, the upper portion of said rear handle bar post, and the lower portion of said rear seat mast; and a support member connected at one end to said rear reach bar at a point between said rear handle bar post and said rear seat mast and at the other end to said double bars, said support member being essentially parallel to said rear handle bar post and said rear seat mast.

2. A tandem bicycle frame comprising a fork housing; a front crank housing; a lower reach bar rigidly interconnecting said fork housing and said front crank housing; a rear reach bare rigidly connected to said front crank housing and extending substantially horizontally rearwardly therefrom; a support member rigidly connected to and extending upwardly from said rear reach bar; a rear crank housing rigidly mounted on the rearward end of said rear reach bar; an upwardly extending rear handle bar post rigidly connected to said rear reach bar at a point between said crank housings; front and rear seat masts rigidly connected to and extending upwardly from said front and rear crank housings, respectively; an upper reach bar rigidly interconnecting said fork housing and the upper portion of said front seat mast; and double bars rigidly and tangentially connected near the forward portion of said lower reach bar and extending continuously rearwardly to rigid connections with the upper portion of said front seat mast, the upper portion of said rear handle bar post, the upper portion of said support member and the lower portion of said rear seat mast.

3. A tandem bicycle frame comprising a fork housing for receiving the front wheel assembly; a front crank housing; a lower reach bar rigidly interconnecting said fork housing and said front crank housing; a rear reach bar rigidly connected to said front crank housing and extending substantially horizontally rearwardly therefrom; a rear crank housing rigidly mounted on the rearward end of said rear reach bar; an upwardly extending rear handle bar post rigidly connected to said rear reach bar at a point between said crank housings; front and rear seat masts rigidly connected to and extending upwardly from said front and rear crank housings, respectively; rear fork means connected to said rear seat mast and said rear crank housing for mounting a rear wheel assembly; an upper reach bar rigidly interconnecting said fork housing and the upper portion of said front seat mast; and bar means rigidly connected near the forward portion of said lower reach bar and extending continuously rearwardly to rigid connections with the upper portion of said front seat mast, the upper portion of said rear handle bar post, and the lower portion of said rear seat mast.

References Cited in the file of this patent

UNITED STATES PATENTS

| 2,855,220 | Douglas et al. | Oct. 7, 1958 |

FOREIGN PATENTS

| 23,373 | Great Britain | of 1896 |
| 834,807 | France | Sept. 5, 1938 |